United States Patent
Tsirkin

(10) Patent No.: US 11,061,730 B2
(45) Date of Patent: Jul. 13, 2021

(54) EFFICIENT SCHEDULING FOR HYPER-THREADED CPUS USING MEMORY MONITORING

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 230 days.

(21) Appl. No.: 15/355,747

(22) Filed: Nov. 18, 2016

(65) Prior Publication Data

US 2018/0143828 A1   May 24, 2018

(51) Int. Cl.
  *G06F 9/50* (2006.01)
  *G06F 9/30* (2018.01)

(52) U.S. Cl.
  CPC .......... *G06F 9/505* (2013.01); *G06F 9/30087* (2013.01)

(58) Field of Classification Search
  CPC ............................. G06F 9/505; G06F 9/30087
  See application file for complete search history.

(56) References Cited

U.S. PATENT DOCUMENTS

| | | |
|---|---|---|
| 7,640,384 B2 | 12/2009 | Hammarlund et al. |
| 8,276,142 B2 | 9/2012 | Alameldeen et al. |
| 8,296,762 B2 | 10/2012 | Knauerhase et al. |
| 8,935,699 B1 | 1/2015 | Vincent et al. |
| 8,990,597 B2 | 3/2015 | Dixon et al. |
| 9,170,843 B2 | 10/2015 | Glew et al. |
| 2003/0126186 A1* | 7/2003 | Rodgers ............... G06F 9/3009 718/107 |
| 2004/0267996 A1* | 12/2004 | Hammarlund ....... G06F 1/3203 710/200 |
| 2011/0154079 A1* | 6/2011 | Dixon .................. G06F 1/3203 713/323 |
| 2013/0047011 A1* | 2/2013 | Dice ...................... G06F 9/485 713/320 |
| 2013/0061005 A1* | 3/2013 | Overby .................... G06F 9/52 711/151 |

(Continued)

OTHER PUBLICATIONS

Welch (Impact of Load Imbalance on Processors with Hyper-Threading Technology); Mar. 22, 2011; 4 pages; accessed on Feb. 1, 2017 at https://software.intel.com/en-us/articles/impact-of-load-imbalance-on-processors-with-hyper-threading-technology.*

(Continued)

*Primary Examiner* — Keith E Vicary
(74) *Attorney, Agent, or Firm* — K&L Gates LLP

(57) ABSTRACT

A system and method for scheduling of hyper-threaded CPUs using memory monitoring includes a memory with an operating system memory and a physical processor in communication with the memory. The physical processor includes a first hyper-thread and a second hyper-thread. A monitor instruction to monitor for updates to a designated memory location is executed in the first hyper-thread. The system further includes an operating system to execute on the physical processor and a system call configured to record in the operating system memory that the first hyper-thread is in a memory wait state. The system call is further configured to execute a memory wait instruction in the first hyper-thread. A task is executed in the second hyper-thread while the first hyper-thread is in the memory wait state.

14 Claims, 5 Drawing Sheets

(56) References Cited

U.S. PATENT DOCUMENTS

| | | | | |
|---|---|---|---|---|
| 2013/0262902 A1* | 10/2013 | Herdrich | ............... | G06F 9/5094 |
| | | | | 713/323 |
| 2014/0075163 A1* | 3/2014 | Loewenstein | ....... | G06F 9/30043 |
| | | | | 712/225 |
| 2015/0049769 A1* | 2/2015 | Tamir | ...................... | G06F 13/00 |
| | | | | 370/412 |
| 2015/0095580 A1* | 4/2015 | Liu | ....................... | G06F 12/084 |
| | | | | 711/130 |
| 2017/0185458 A1* | 6/2017 | Chaffin | ..................... | G06F 9/52 |

OTHER PUBLICATIONS

Molnar (fully HT-aware scheduler support, 2.5.31-BK-curr); Aug. 27, 2002; 16 pages; accessed on Feb. 1, 2017 at https://lwn.net/Articles/8553/.*

Bulpin et al. (Hyper-Threading Aware Process Scheduling Heuristics); 2005 USENIX Annual Technical Conference; 2005; pp. 399-402.*

Anastopoulos et al., Facilitating Efficient Synchronization of Asymmetric Threads on Hyper-Threaded Processors, National Technical University of Athens School of Electrical and Computer Engineering, Apr. 14, 2008 (8 pages).

Multi-core and multi-threading performance (the multi-core myth?), Scali's OpenBlog™, Jun. 1, 2012, Link: https://scalibq.wordpress.com/2012/06/01/multi-core-and-multi-threading/ (30 pages).

VMware CPU Hyper Threading Scheduling Affinity, Apr. 23, 2015, Link: http://serverfault.com/questions/685016/vmware-cpu-hyper-threading-scheduling-affinity (3 pages).

* cited by examiner

EFFICIENT SCHEDULING FOR HYPER-THREADED CPUS USING MEMORY MONITORING

BACKGROUND

Hyper-threading technology enables execution of threads in parallel using a single processor. In a processor supporting hyper-threading, a single physical processor appears as two logical processors (hyper-threads). Because the processor resources are shared and the architectural state is duplicated for the two hyper-threads, communication through shared memory between the two hyper-threads within the same processor is relatively cheap and efficient.

In order to preserve power resources and lower overhead usage, physical processors may utilize memory monitoring instructions designating a range of memory that allow the physical processor to stop instruction execution. The physical processor executing the monitoring instruction is blocked from further execution and enters a wait state until there is a change to the designated memory by another physical processor or an inter-processor interrupt is received. Using x86 instruction set architecture as an example, this feature includes a MONITOR instruction and an MWAIT instruction. The MONITOR instruction causes the processor hardware to monitor a range of memory addresses designated by the MONITOR instruction. If there is a change to the designated memory (e.g., data storing), a signal is triggered within the processor hardware. This signal may be used by the MWAIT instruction. The MWAIT instruction causes the processor to enter a halt state until data has been written to a memory address within the range designated by the MONITOR instruction. If a processor is in a halt state as a result of the MWAIT instruction, a change to the designated memory may bring that processor out of the halt state.

SUMMARY

The present disclosure provides new and innovative methods and systems for efficient scheduling of hyper-threaded CPUs using memory monitoring. For example, an example system includes a memory having an operating system memory and a physical processor in communication with the memory. The physical processor includes a first hyper-thread and a second hyper-thread. A monitor instruction to monitor for updates to a designated memory location is executed in the first hyper-thread. The example system further includes an operating system to execute on the physical processor and a system call configured to record in the operating system memory that the first hyper-thread is in a memory wait state. The system call is further configured to execute a memory wait instruction in the first hyper-thread. A task is executed in the second hyper-thread while the first hyper-thread is in the memory wait state.

Additional features and advantages of the disclosed methods and system are described in, and will be apparent from, the following Detailed Description and the Figures.

DETAILED DESCRIPTION OF EXAMPLE EMBODIMENTS

Figure 1:
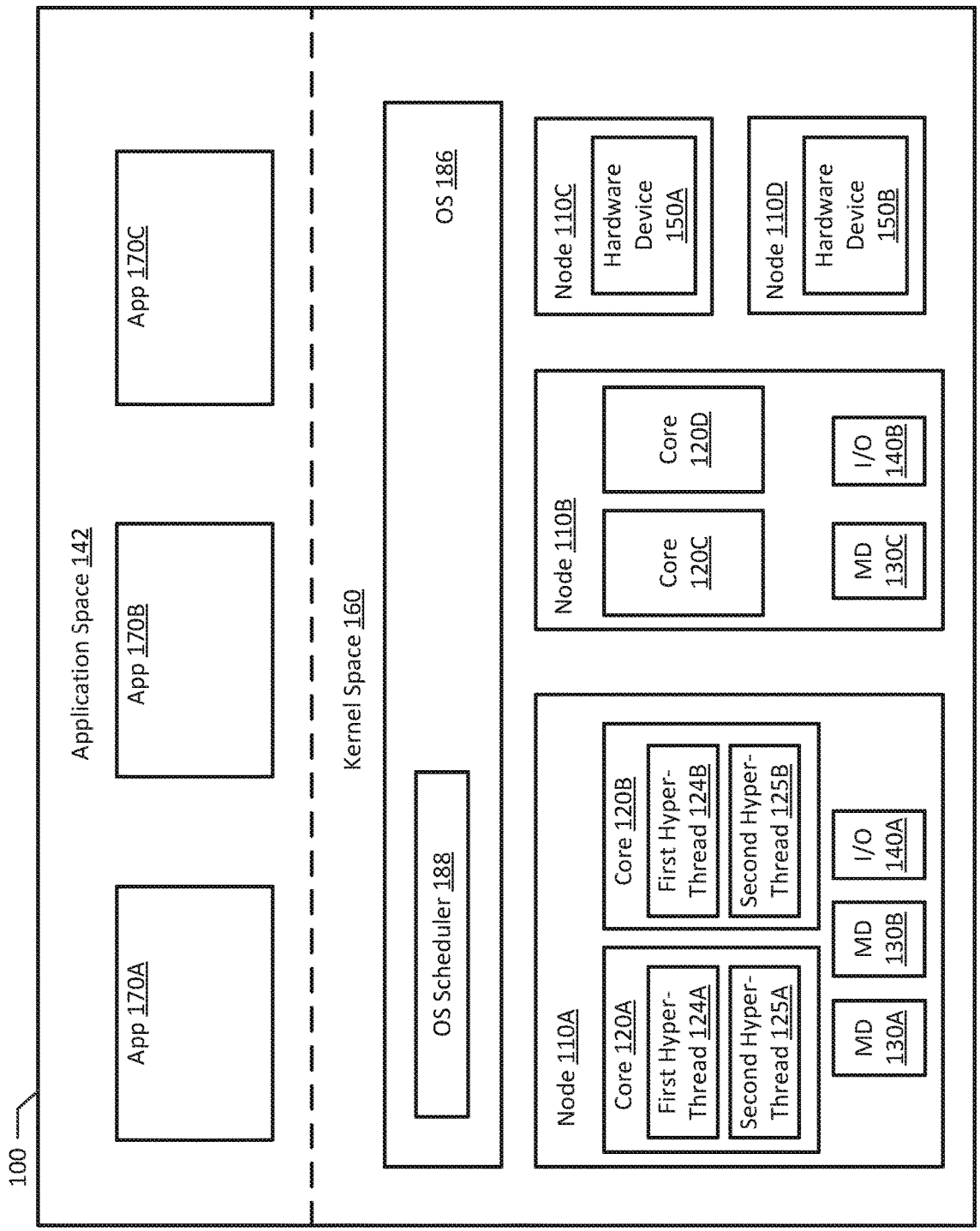
FIG. 1 is a block diagram of an example system for efficient scheduling of hyper-threaded CPUs using memory monitoring according to an example embodiment of the present disclosure.

Described herein are methods and systems for efficient scheduling of hyper-threaded CPUs using memory monitoring. As discussed above, hyper-threading technology allows multiple (typically two) hyper-threads to share an execution engine, which allows a single processor to execute two threads in parallel. However, because the execution engine is shared between multiple hyper-threads, unless one of the hyper-threads is halted, the other hyper-thread typically executes at best at half the maximum speed. For this reason, operating system schedulers may try to avoid scheduling two active threads on two hyper-threads within the same processor at the same time. For example, non-idle hyper-threads are recorded and operating system schedulers may try to avoid scheduling a thread to any processors having any non-idle hyper-threads. Generally, when there are routinely sufficient processors with only idle hyper-threads, this approach may typically work well. However, this approach is not effective when there are not enough processors that are in an idle state. For example, if all processors are in non-idle states (i.e., having at least one non-idle hyper-thread), the operating system scheduler may need to schedule the thread to a hyper-thread in a non-idle processor. Therefore, that hyper-thread may execute the thread at best at half the maximum speed.

Aspects of the present disclosure may address the above noted deficiency by using memory monitoring instructions for efficient scheduling of hyper-threaded CPUs. In an example, when an application sends a request for a task to an operating system, a first hyper-thread in a physical processor may execute a monitor instruction to monitor for updates to a designated memory location. Then, the application may execute a system call configured to record, in an operating system memory, the first hyper-thread as in a memory wait state and execute the memory wait instruction in the first hyper-thread. The operating system may determine execution states of hyper-threads and physical processors, and may avoid scheduling a task to a hyper-thread in a non-idle state. In determining the execution states of the hyper-threads, the operating system may consider a hyper-thread executing a memory wait instruction as in a non-idle state to prevent a task from being scheduled to such hyper-thread.

In determining the execution states of the physical processors, the operating system may consider a physical processor having at least one non-idle hyper-thread as in the non-idle state. The operating system may try to avoid scheduling a task to a hyper-thread in a physical processor in the non-idle state. However, the operating system may consider the execution state of a physical processor, where one hyper-thread is executing the memory wait instruction and the other hyper-thread is in the idle state, as in the idle state so that the task can be scheduled to a sibling hyper-thread in the same physical processor having the hyper-thread executing the memory wait instruction. In an example, the operating system may be configured to schedule a task in an idle hyper-thread in a physical processor having a non-idle hyper-thread that is executing a memory wait instruction first.

In this way, instead of using a hyper-thread to poll a shared memory for a task to be executed (or after using the hyper-thread to poll the shared memory for a while), the system may use a system call, which executes a memory wait instruction in a hyper-thread so that a sibling hyper-thread in the same physical processor with that hyper-thread can be freed up for a task. Then, a task can be scheduled to that sibling hyper-thread and the sibling hyper-thread may be able to execute the task at maximum speed. In an example, the task executed in the sibling hyper-thread is a task modifying the designated memory location. In this case, since the task modifying the designated memory location is scheduled in the same physical processor, latency would be reduced significantly. For example, if a second hyper-thread executes a task modifying the designated memory location while the first hyper-thread is in a memory wait state, the first hyper-thread would be out of the halt state as soon as the designated memory location is modified by the task and can be used to execute a new task. Because the second hyper-thread can wake the first hyper-thread from a halt state without using interrupts as soon as the task scheduled in the second hyper-thread is completed, this may significantly increase efficiency of inter-process communication.

Therefore, the present disclosure advantageously reduces latency for memory communication and obtains better CPU utilization, which allows addressing requirements for a system with demanding workloads, such as a network function virtualization (NFV) system. Thus, the existing hyper-threading hardware processors are significantly improved upon with the presently disclosed, more efficient hardware processors. Additional features and advantages of the disclosed method, system, and apparatus are described below.

FIG. 1 depicts a high-level component diagram of an example system 100 in accordance with one or more aspects of the present disclosure. The system 100 may include a memory (e.g., MD 130A-C), an operating system (OS) 186, and one or more processors (Core 120A-D) configured to execute threads. The OS 186 may include a kernel. For example, the kernel may be a program that constitutes the core of the OS 186. As used herein, the kernel may refer to a privileged software component with the ability to change memory mappings for an application (e.g., Applications 170A-C). Additionally, the kernel may act as a controller of multiple processes including individual user processes within the application space 142. For example, a kernel may perform several tasks such as executing processes and handling interrupts in the kernel space 160.

Additionally a user may run programs or applications (e.g., Applications 170A-C) in the application space 142. An application (e.g., Applications 170A-C) may be an application in user space, an application in a virtual machine, or an application located elsewhere (e.g., a container), all of which make up the application space 142. The kernel may provide basic services for the OS 186 that are requested by other parts of the OS 186 or by application programs through system calls. In a typical example, the kernel may provide basic services such as memory management, process management, file management, and I/O management.

In various example embodiments, the kernel may be a monolithic kernel, a microkernel, a hybrid kernel, or an exokernel. Additionally, the kernel may include an OS scheduler 188, a supervisor, an interrupt handler, and a memory manager. In an example embodiment, the OS scheduler 188 may determine the order various processes are handled on the kernel. Additionally, the OS scheduler 188 may determine how various processes share the kernel's processing time. In an example embodiment, the supervisor may grant use of the computer system to each process after it is scheduled by the OS scheduler 188. Additionally, the interrupt handler may handle requests from various hardware devices (e.g., Hardware Devices 150A-B) that require the kernel's service. The memory manager may allocate the system's address spaces (e.g., locations in memory) to the users of the kernel's services.

The system 100 may include one or more interconnected nodes 110A-D. Each node 110A-B may in turn include one or more physical processors (e.g., Core 120A-D) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The system 100 may also include one or more applications (e.g., Applications 170A-C) operating within application space 142.

As used herein, physical processor or processor 120 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may provide a hyper-threading technology where a single physical processor may appear as two logical processors (e.g., a first hyper-thread 124A-B and a second hyper-thread 125A-B). In a processor using the hyper-threading technology, the physical processor resources are shared between the two logical processors and the architectural state is duplicated for the two logical processors. In an example, each processor may include more than two logical processors (e.g., three or four hyper-threads).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-C may be provided by one or more local buses of suitable architecture, for example, peripheral component interconnect (PCI).

Figure 2:
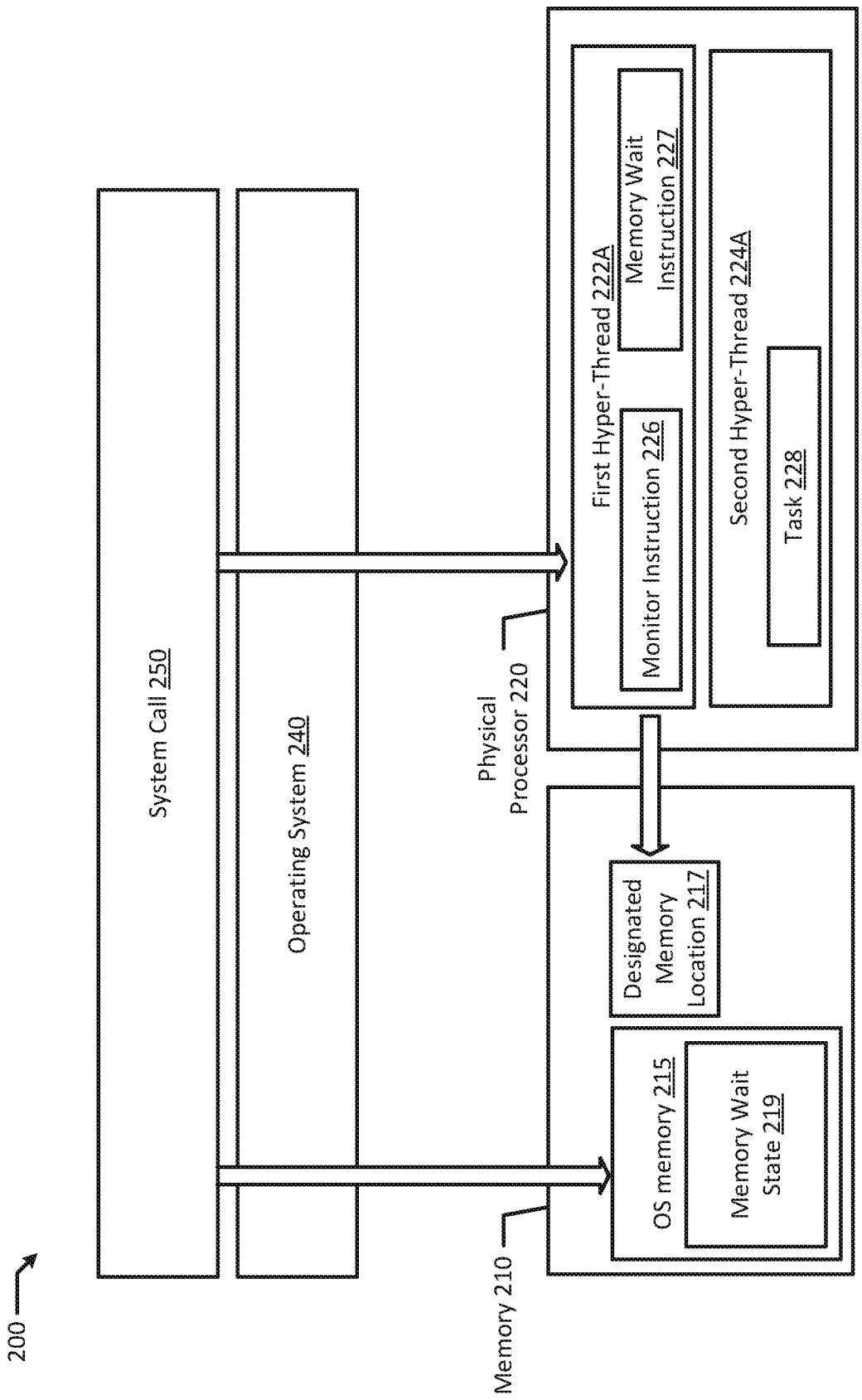
FIG. 2 is a block diagram of an example system according to an example embodiment of the present disclosure.

FIG. 2 shows a block diagram of an example system according to an example of the present disclosure. As illustrated in FIG. 2, an example system 200 may include a memory 210 having an OS memory 215 and a physical processor 220 in communication with the memory 210. The physical processor 220 may include a first hyper-thread 222A and a second hyper-thread 224A. In an example, a monitor instruction 226 to monitor for updates to a designated memory location 217 may be executed in the first hyper-thread 222A. The system 200 may further include an operating system 240 to execute on the physical processor 220. In an example, the system 200 may also include a system call 250 configured to record in the operating system memory 215 that the first hyper-thread 222A is in a memory wait state 219. The system call 250 may also be configured to execute a memory wait instruction 227 in the first hyper-thread 222A. In an example, a task 228 may be executed in the second hyper-thread 224A while the first hyper-thread 222A is in the memory wait state 219.

Figure 3:
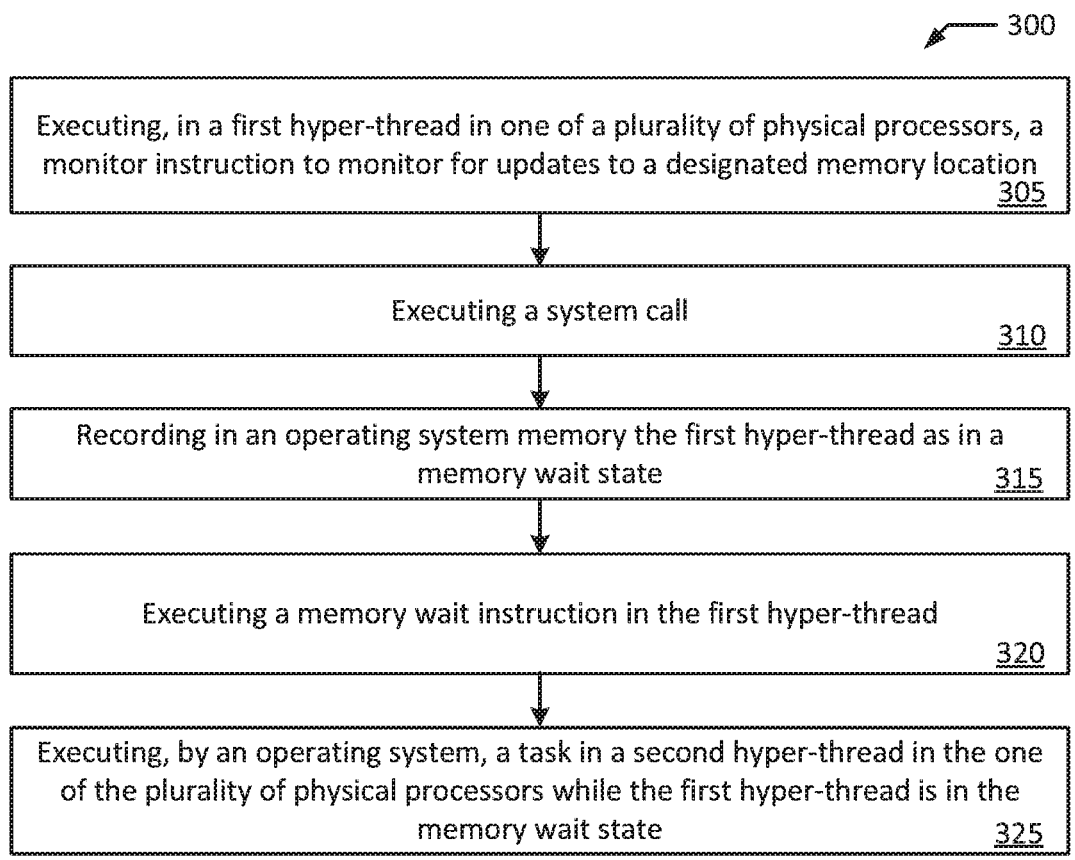
FIG. 3 is a flowchart illustrating an example method for efficient scheduling of hyper-threaded CPUs using memory monitoring according to an example embodiment of the present disclosure.

FIG. 3 shows a flowchart of an example method 300 for efficient scheduling of hyper-threaded CPUs using memory monitoring. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a monitor instruction to monitor for updates to a designated memory location may be executed in a first hyper-thread in one of a plurality of physical processors (block 305). For example, the monitor instruction may be executed in a first hyper-thread 124A of a first physical processor 120A. Then, a system call may be executed (block 310). In an example, an application 170A may execute the system call. Then, the first hyper-thread may be recorded as in a memory wait state (block 315). For example, the system call may be configured, when executed, to record the first hyper-thread 124A as in a memory wait state. Then, a memory wait instruction may be executed in the first hyper-thread (block 320). In an example, the system call may be configured, when executed, to execute the MWAIT instruction in the first hyper-thread 124A. In an example, the monitor instruction executed in the first hyper-thread 124A may be also executed by the system call. Then, an operating system may execute a task in a second hyper-thread in the one of the plurality of physical processors while the first hyper-thread is in the memory wait state (block 325).

For example, the OS 186 may execute a task in a second hyper-thread 125A in the physical processor 120A while the first hyper-thread 124A is in the memory wait state.

Figure 4A:
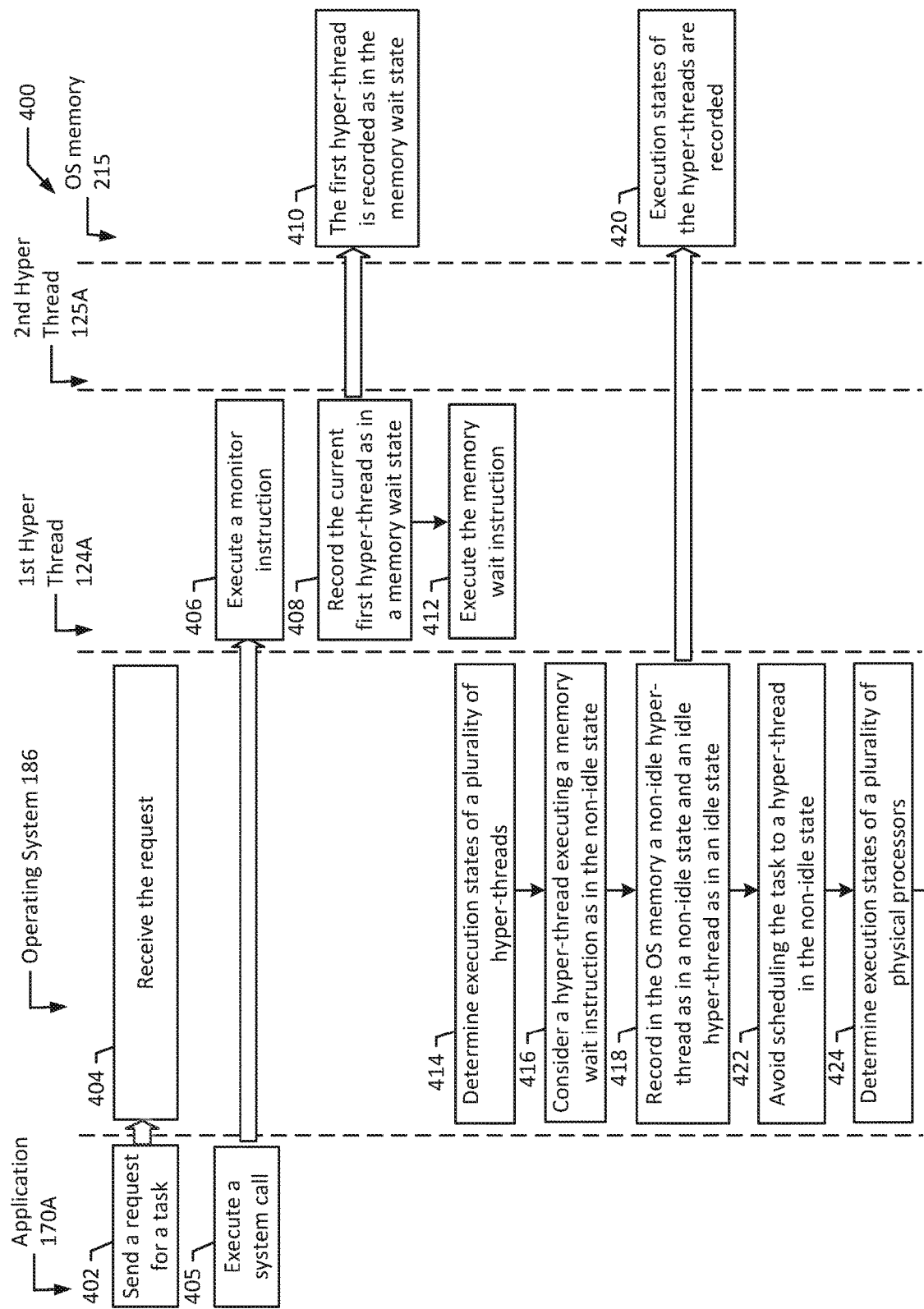
FIGS. 4A and 4B are flow diagrams illustrating an example process for efficient scheduling of hyper-threaded CPUs using memory monitoring according to an example embodiment of the present disclosure.
Figure 4B:
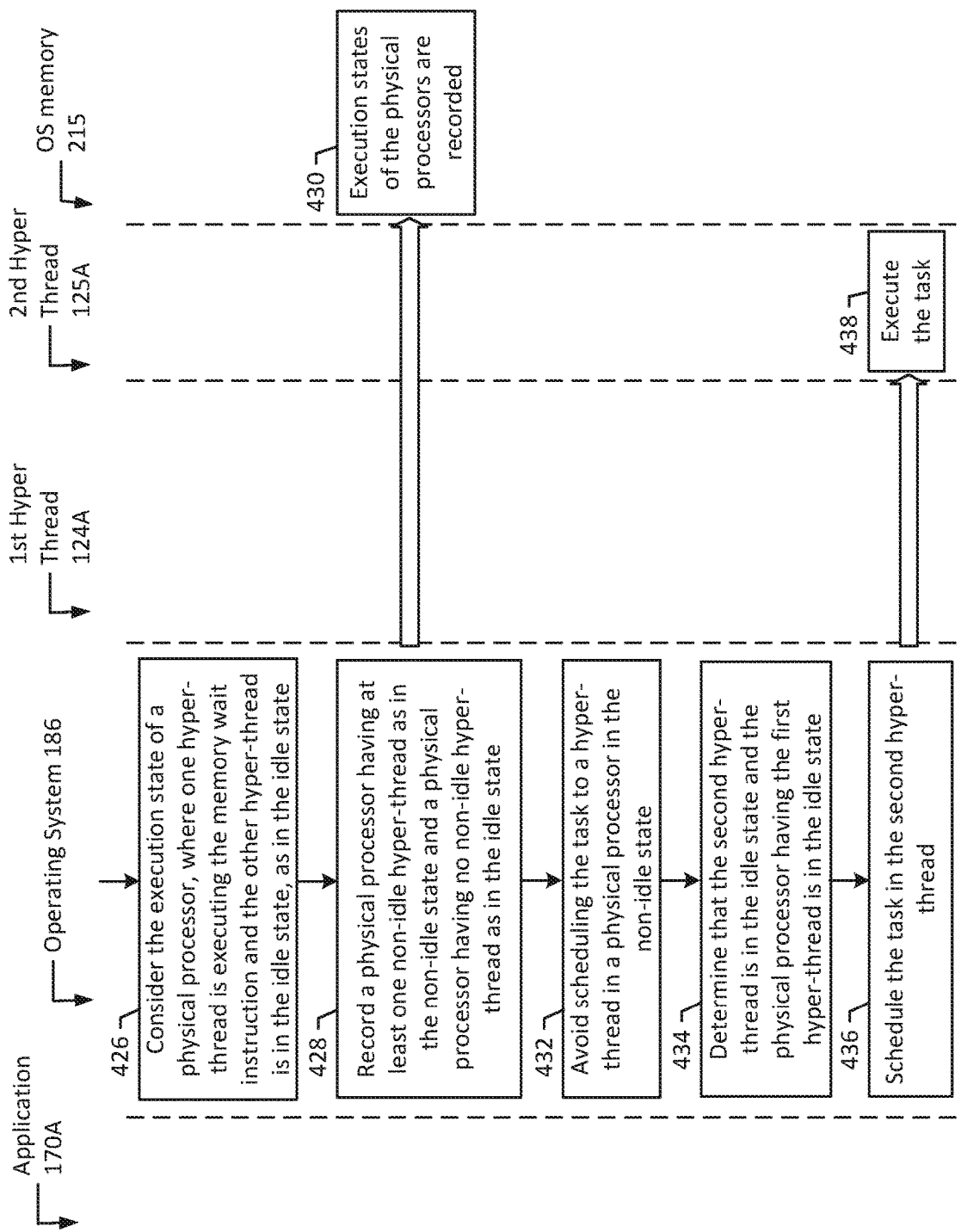

FIGS. 4A and 4B illustrate flow diagrams of an example method 400 for efficient scheduling of hyper-threaded CPUs using memory monitoring according to an example embodiment of the present disclosure. Although the example method 400 is described with reference to the flow diagrams illustrated in FIGS. 4A and 4B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both.

In the illustrated example, an application 170A may send a request for a task to an operating system 186 (blocks 402 & 404). In an example, the application 170A may execute a system call (block 405). Then, a first hyper-thread 124A in a first physical processor 120A may execute a monitor instruction to monitor for updates to a designated memory location (block 406). In an example, the first hyper-thread 124A may execute the monitor instruction before the application 170A executes the system call. In an example, when a monitor instruction is executed, a range of memory addresses may be designated and monitored. In another example, when a monitor instruction is executed, multiple ranges of memory addresses may be designated and monitored. In an example, a system call 250 may be configured, when executed, to execute the monitor instruction in the first hyper-thread 124A. In an example, the monitor instruction is executed without polling a shared device or after polling the shared device for a period of time. The system call may be configured to record, in an OS memory 215, the current first hyper-thread 124A as in a memory wait state (blocks 408 & 410). Then, the first hyper-thread 124A may execute the memory wait instruction (block 412). Applications are normally not allowed to execute a monitoring instruction and a memory wait instruction. The present disclosure allows applications to, in effect, execute the monitoring instruction and memory wait instruction through the use of system calls as described herein.

In an example, the system call 250 may be configured, when executed, to record, in the OS memory 215, the current first hyper-thread 124A as not in a memory wait state 219. For example, if there is a change to the designated memory location 217, this may bring the first hyper-thread 124A out of the halt state, then the system call 250 may record, in the OS memory 215, that the first hyper-thread 124A is not in the memory wait state 219. In an example, the system call 250 may also be configured to execute a cache flush instruction, which writes back all the data updated or modified solely within a cache memory into a main memory.

In an example, the operating system 186 may determine execution states of a plurality of hyper-threads in a plurality of physical processors (block 414). For example, if a system has a first physical processor 120A and a second physical processor 120B, the operating system 186 may determine execution states of the first hyper-threads 124A-B and the second hyper-threads 125A-B. In an example, the execution state may be either idle or non-idle. In determining the execution state of the hyper-threads, the operating system 186 may consider a hyper-thread executing a memory wait instruction (in a memory wait state) as in a non-idle state to prevent a task from being scheduled to the hyper-thread executing the memory wait instruction (block 416). The operating system 186 may record in the OS memory 215 a non-idle hyper-thread as in a non-idle state and an idle hyper-thread as in an idle state (blocks 418 & 420). In an example, the operating system 186 may be configured to avoid scheduling a task to a hyper-thread in the non-idle state (block 422).

Then, the operating system 186 may determine execution states of the plurality of physical processors (block 424). For example, the operating system 186 may determine execution states of the first and second physical processors 120A-B. In an example, the operating system 186 may consider a physical processor having at least one non-idle hyper-thread as being in the non-idle state. For example, if at least one of the first and second hyper-threads 124B, 125B in the second physical processor 120B is in the non-idle state (and none of the first and second hyper-threads 124B, 125B are in a memory wait state), the operating system 186 may consider the second physical processor 120B as in the non-idle state. In determining the execution state of the physical processors, the operating system 186 may consider the execution state of a physical processor, where one hyper-thread is executing the memory wait instruction and the other hyper-thread is in the idle state, as in the idle state (block 426). That is, the state of the hyper-thread executing a memory wait instruction, which is non-idle, would not affect the state of the physical processor having the hyper-thread executing the memory wait instruction. For example, if the first hyper-thread 124A is in a memory wait state, the execution state of the physical processor 120A may depend on the execution state of the second hyper-thread 125A: if the second hyper-thread 125A is in an idle state—idle; and if the second hyper-thread 125A is in a non-idle state—non-idle. In an example, the operating system 186 may determine whether any hyper-threads are executing the memory wait instruction.

Then, the operating system 186 may be configured to record, in the OS memory 215, a physical processor having at least one non-idle hyper-thread as in the non-idle state and a physical processor having no non-idle hyper-thread as in the idle state (blocks 428 & 430). The operating system 186 may be configured to avoid scheduling a task to a hyper-thread in a physical processor in the non-idle state (block 432). In an example, the operating system 186 may determine that the second hyper-thread 125A is in the idle state and the physical processor 120A having the first hyper-thread 124A in the memory wait state is in the idle state (block 434). The operating system 186 may schedule the task received from the application 170A in the second hyper-thread 125A (block 436). Then, the second hyper-thread 125A may execute the task (block 438). In an example, the task executed in the second hyper-thread may modify the memory location designated by the monitoring instruction. In another example, the task executed in the second hyper-thread may be unrelated to modifying the designated memory location. In an example, the operating system 186 may be configured to schedule a task in an idle hyper-thread in a physical processor having a non-idle hyper-thread that is executing a memory wait instruction first. In an example, all or some of the steps performed by the operating system 186 discussed above, may be performed by the operating system scheduler 188.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The example embodiments may be embodied in the form of computer-implemented processes and apparatuses for practicing those processes. An embodiment may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An embodiment may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
  a memory, wherein the memory includes an operating system memory;
  one or more physical processors in communication with the memory, wherein the one or more physical processors comprise a first physical processor that includes a first hyper-thread and a second hyper-thread, wherein a monitor instruction to monitor for updates to a designated memory location is executed in the first hyper-thread;
  an operating system to execute on the one or more physical processors; and
  a system call to:
    record in the operating system memory that the first hyper-thread is in a memory wait state; and
    execute a memory wait instruction in the first hyper-thread,
  wherein the operating system:
    determines an execution state of each of the first hyper-thread and the second hyper-thread, wherein the execution state of each of the first hyper-thread and the second hyper-thread is one of an idle state and a non-idle state, wherein the second hyper-thread is in the idle state;
    determines that the first hyper-thread executing the memory wait instruction is in the non-idle state such that the operating system prevents a task from being scheduled to the first hyper-thread;
    determines an execution state of each of the one or more physical processors, wherein the execution state of each of the one or more physical processors is one of an idle state and a non-idle state;
    determines that the execution state of each of the one or more physical processors is in the non-idle state;
    in response to determining that each of the one or more physical processors is in the non-idle state, determines whether the first hyper-thread of the first physical processor is executing the memory wait instruction; and
    in response to determining that each of the one or more physical processors is in the non-idle state and the first hyper-thread of the first physical processor is in the non-idle state due to the memory wait instruction, determines that the first physical processor, where the first hyper-thread is executing the memory wait instruction and the second hyper-thread is in the idle state, is in the idle state,
  wherein the task is executed in the second hyper-thread while the first hyper-thread is in the memory wait state,
  wherein the task executed in the second hyper-thread modifies the designated memory location, and
  wherein the operating system schedules a second task in an idle hyper-thread in a physical processor having a sibling hyper-thread that is already executing the memory wait instruction.

2. The system of claim 1, wherein the operating system:
records in the operating system memory that the first hyper-thread executing the memory wait instruction is in the non-idle state;
records in the operating system memory that the second hyper-thread is in the idle state; and
schedules the task to the second hyper-thread.

3. The system of claim 2, wherein the one or more physical processors further comprise a second physical processor having a third hyper-thread and a fourth hyper-thread, wherein the operating system:
determines the execution state of the second physical processor; and
records in the operating system memory the execution state of each of the first and second physical processors.

4. The system of claim 3, wherein at least one of the third hyper-thread and the fourth hyper-thread is in the non-idle state and the operating system determines that the second physical processor is in the non-idle state.

5. The system of claim 4, wherein the operating system determines whether each one of the first hyper-thread, the second hyper-thread, the third hyper-thread, and the fourth hyper-thread is executing the memory wait instruction.

6. The system of claim 1, further comprising an application, wherein the system call is executed by the application.

7. The system of claim 1, wherein the system call, when executed, executes the monitor instruction to monitor for updates to the designated memory location in the first hyper-thread.

8. The system of claim 1, wherein the system call, when executed, executes a cache flush instruction.

9. A method comprising:
executing, in a first hyper-thread of a first physical processor, a monitor instruction to monitor for updates to a designated memory location, wherein a computer system includes a memory, one or more physical processors in communication with the memory, an operating system executing on the one or more physical processors, and a system call, wherein the memory includes an operating system memory, and wherein the one or more physical processors comprise the first physical processor, wherein the first physical processor further includes a second hyper-thread;
executing the system call, wherein the system call, when executed:
records in the operating system memory that the first hyper-thread is in a memory wait state; and
executes a memory wait instruction in the first hyper-thread,
determining, by the operating system, an execution state of each of the first hyper-thread and the second hyper-thread, wherein the execution state of each of the first hyper-thread and the second hyper-thread is one of an idle state and a non-idle state, wherein the second hyper-thread is in the idle state;
determining, by the operating system, that the first hyper-thread executing the memory wait instruction is in the non-idle state such that the operating system prevents a task from being scheduled to the first hyper-thread;
determining, by the operating system, an execution state of each of the one or more physical processors, wherein the execution state of each of the one or more physical processors is one of an idle state and a non-idle state;
determining, by the operating system, that the execution state of each of the one or more physical processors is in the non-idle state;
in response to determining that each of the one or more physical processors is in the non-idle state, determining, by the operating system, whether the first hyper-thread of the first physical processor is executing the memory wait instruction;
in response to determining that each of the one or more physical processors is in the non-idle state and the first hyper-thread of the first physical processor is in the non-idle state due to the memory wait instruction, determining, by the operating system, that the first physical processor, where the first hyper-thread is executing the memory wait instruction and the second hyper-thread is in the idle state, is in the idle state;
executing, by the operating system, the task in the second hyper-thread while the first hyper-thread is in the memory wait state, wherein the task executed in the second hyper-thread modifies the designated memory location; and
scheduling, by the operating system, a second task in an idle hyper-thread in a physical processor having a sibling hyper-thread that is already executing the memory wait instruction.

10. The method of claim 9, further comprising:
recording, by the operating system, in the operating system memory that the first hyper-thread executing the memory wait instruction is in the non-idle state;
recording, by the operating system, in the operating system memory that the second hyper-thread is in the idle state; and
scheduling, by the operating system, the task to the second hyper-thread.

11. The method of claim 10, wherein the one or more physical processors further comprise a second physical processor having a third hyper-thread and a fourth hyper-thread, the method further comprising:
determining, by the operating system, the execution state of the second physical processor; and
recording, by the operating system, in the operating system memory the execution state of each of the first and second physical processors.

12. The method of claim 11, wherein at least one of the third hyper-thread and the fourth hyper-thread is in the non-idle state and the operating system determines that the second physical processor is in the non-idle state.

13. The method of claim 12, further comprising determining, by the operating system, whether each one of the first hyper-thread, the second hyper-thread, the third hyper-thread, and the fourth hyper-thread is executing the memory wait instruction.

14. A non-transitory machine readable medium storing instructions, which when executed by one or more physical processors in a computer system, cause the computer system to perform a method comprising:
executing, in a first hyper-thread in a first physical processor of the one or more physical processors, a monitor instruction to monitor for updates to a designated memory location, wherein the first physical processor comprises the first hyper-thread and a second hyper-thread;
executing a system call in the computer system, wherein the system call, when executed:
records in an operating system memory that the first hyper-thread is in a memory wait state; and
executes a memory wait instruction in the first hyper-thread;
determining, by an operating system executing on the one or more physical processors, an execution state of each of the first hyper-thread and the second hyper-thread, wherein the execution state of each of the first hyper-thread and the second hyper-thread is one of an idle state and a non-idle state, wherein the second hyper-thread is in the idle state;

determining, by the operating system, that the first hyper-thread executing the memory wait instruction is in the non-idle state such that the operating system prevents a task from being scheduled to the first hyper-thread;

determining, by the operating system, an execution state of each of the one or more physical processors, wherein the execution state of each of the one or more physical processors is one of an idle state and a non-idle state;

determining, by the operating system, that the execution state of each of the one or more physical processors is in the non-idle state;

in response to determining that each of the one or more physical processors is in the non-idle state, determining, by the operating system, whether the first hyper-thread of the first physical processor is executing the memory wait instruction;

in response to determining that each of the one or more physical processors is in the non-idle state and the first hyper-thread of the first physical processor is in the non-idle state due to the memory wait instruction, determining, by the operating system, that the first physical processor, where the first hyper-thread is executing the memory wait instruction and the second hyper-thread is in the idle state, is in the idle state;

executing, by the operating system executing on the one or more physical processors, the task in the second hyper-thread in the first physical processor of the one or more physical processors while the first hyper-thread is in the memory wait state, wherein the task executed in the second hyper-thread modifies the designated memory location; and scheduling, by the operating system, a second task in an idle hyper-thread in a physical processor having a sibling hyper-thread that is already executing the memory wait instruction.

\* \* \* \* \*